(12) United States Patent
Maryanski et al.

(10) Patent No.: US 12,709,835 B2
(45) Date of Patent: Aug. 18, 2026

(54) INTERNAL PASSIVE VENTILATION SOLUTION FOR CLOSED LOOP DRYER SYSTEMS

(71) Applicant: WHIRLPOOL CORPORATION, Benton Harbor, MI (US)

(72) Inventors: Nolan R. Maryanski, Stevensville, MI (US); Timothy N. Blatchley, Stevensville, MI (US); Bret J. Wamhoff, St. Joseph, MI (US); Justin Q. Nguyen, Wyoming, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 719 days.

(21) Appl. No.: 18/192,707

(22) Filed: Mar. 30, 2023

(65) Prior Publication Data

US 2024/0328063 A1 Oct. 3, 2024

(51) Int. Cl.

| | |
|---|---|
| ***D06F 58/20*** | (2006.01) |
| ***D06F 34/00*** | (2020.01) |
| ***D06F 58/04*** | (2006.01) |
| ***D06F 105/32*** | (2020.01) |
| ***F16J 15/40*** | (2006.01) |
| ***F24F 13/20*** | (2006.01) |

(52) U.S. Cl.

CPC .............. *D06F 58/20* (2013.01); *D06F 34/00* (2020.02); *D06F 58/04* (2013.01); *F16J 15/40* (2013.01); *F24F 13/20* (2013.01); *D06F 2105/32* (2020.02)

(58) Field of Classification Search

CPC .......... D06F 34/00; D06F 58/20; D06F 58/04; D06F 2105/32; F16J 15/40; F24F 13/20

USPC ........................................... 34/138, 595–610

See application file for complete search history.

(56) References Cited

U.S. PATENT DOCUMENTS

| | | | | |
|---|---|---|---|---|
| 3,400,467 A * | 9/1968 | Drace | D06F 95/00 34/529 |
| 5,555,640 A * | 9/1996 | Ou | F26B 25/066 312/249.9 |
| 7,188,437 B2 * | 3/2007 | Lee | D06F 25/00 68/180 |
| 7,213,349 B1 * | 5/2007 | Brunner | D06F 58/20 34/86 |
| 7,356,945 B2 * | 4/2008 | Choi | D06F 58/203 34/597 |
| 8,769,840 B2 | 7/2014 | Dondurur et al. | |

(Continued)

FOREIGN PATENT DOCUMENTS

| | | | |
|---|---|---|---|
| EP | 3059342 A1 | 8/2016 | |
| EP | 4438798 A1 * | 10/2024 | F24F 13/20 |

*Primary Examiner* — Stephen M Gravini

(74) *Attorney, Agent, or Firm* — Brooks Kushman, P.C.

(57) ABSTRACT

A laundry appliance may include a front of the cabinet including a front bulkhead housing a first air conduit, the first air conduit defining a first opening configured to selectively receive ambient air, a back of the cabinet defining a basement area housing a second air conduit, the second air conduit defining a second opening for exhausting carbon monoxide outside of the appliance; a door configured to move between open and closed positions to selectively allow access the drum; a first cover arranged at the first opening; a second cover arranged at the second opening; and a processor programmed to instruct the first cover and second cover to open in response to the appliance being in a passive ventilation state.

19 Claims, 4 Drawing Sheets

(56) References Cited

U.S. PATENT DOCUMENTS

| | | | | |
|---|---|---|---|---|
| 8,984,692 | B2 | 3/2015 | Ballinski et al. | |
| 9,181,647 | B2 | 11/2015 | Eglmeier et al. | |
| 9,297,493 | B2 * | 3/2016 | Bison | D06F 58/20 |
| 10,494,756 | B2 | 12/2019 | Beers et al. | |
| 10,961,654 | B2 | 3/2021 | Dunn et al. | |
| 11,060,236 | B2 * | 7/2021 | Djerekarov | D06F 58/30 |
| 11,851,806 | B2 * | 12/2023 | Leibman | D06F 58/04 |
| 12,221,743 | B2 * | 2/2025 | Scheckelhoff | G05B 13/024 |
| 12,467,179 | B2 * | 11/2025 | Masters, Jr. | D06F 58/26 |
| 2004/0168481 | A1 * | 9/2004 | Usherovich | D06F 25/00<br>68/140 |
| 2015/0013074 | A1 | 1/2015 | Ficke et al. | |
| 2019/0218701 | A1 | 7/2019 | Strait | |
| 2024/0328063 | A1 * | 10/2024 | Maryanski | D06F 58/04 |
| 2025/0027262 | A1 * | 1/2025 | James | D06F 58/24 |

* cited by examiner 64
66
72
62
80
54
70
76
42,44
68
45,52

64
66
72
62
80
54
70
76
42,44
68
45,52

INTERNAL PASSIVE VENTILATION SOLUTION FOR CLOSED LOOP DRYER SYSTEMS

TECHNICAL FIELD

Disclosed herein are approaches for detecting obstructions in an exhaust air conduit of dryer laundry appliances.

BACKGROUND

Laundry treating appliances, such as clothes washers, clothes dryers, and refreshers, for example, may have a configuration based on a rotating drum that defines a treating chamber in which laundry items are placed for treating according to a cycle of operation. The laundry treating appliance may have a controller that implements a number of pre-programmed cycles of operation having one or more operating parameters. The cycle of operation may be selected manually by the user or automatically based on one or more conditions determined by the controller. In some laundry appliances, such as a dryer, air may be vented out of the drum. However, the vent may become obstructed with lint, objects, etc.

SUMMARY

A laundry appliance may include a cabinet having a front and back connected by sides and a top and a bottom for housing a drum configured to receive laundry items and treat the laundry items during a treatment cycle, the front of the cabinet including a front bulkhead housing a first air conduit, the first air conduit defining a first opening configured to selectively receive ambient air, the back of the cabinet defining a basement area housing a second air conduit, the second air conduit defining a second opening for exhausting carbon monoxide outside of the appliance; a door configured to move between open and closed positions to selectively allow access the drum; a first cover arranged at the first opening; a second cover arranged at the second opening; and a processor programmed to instruct the first cover and second cover to open in response to the appliance being in a passive ventilation state.

A vent cover for an air conduit of a laundry appliance may include a frame defining a receptacle open at a proximal and distal end of the frame, the frame configured to attach to an air conduit; a motor arranged within the frame, the motor having a piston extending from a distal end of the motor and configured to selectively actuate; a plunger seal having a neck extending from a base, the neck attached to the piston and configured to move laterally upon actuation of the piston between and open position and a closed position, where the base is configured to abut and seal an opening defined in the air conduit in the closed position to prevent air from escaping the opening and to recede from the opening in the open position to allow air to flow from the opening.

A laundry appliance may include a cabinet having a front and back connected by sides and a top and a bottom for housing a drum configured to receive laundry items and treat the laundry items during a treatment cycle; a door configured to move between open and closed positions to selectively allow access to the drum; at least one air conduit configured to supply air to a drum of the appliance; at least one vent cover configured to selectively vent air from the air conduit; and a processor configured to instruct the vent cover to open in response to the door being closed and the appliance not performing a treatment cycle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Passive ventilation systems in laundry appliances, such as dryers, may aid in reducing odor build up during non-use of the appliance. For example, such passive ventilation may occur when the door to the appliance is closed and the appliance it not in use. Disclosed herein is an appliance having a first opening on the front bulkhead of the appliance for receiving ambient air external to the appliance, and a second opening at the back basement of the appliance for exhausting carbon monoxide. The openings may be selectively opened and closed by a vent cover, such as a plunger seal. The plunger seal may be controlled by a wax motor to move between open and closed positions. Such openings and passive ventilation may replace or supplement traditional methods of using heat pump dryers that only provide minimal ventilation when the appliance door is closed.

Figure 1:
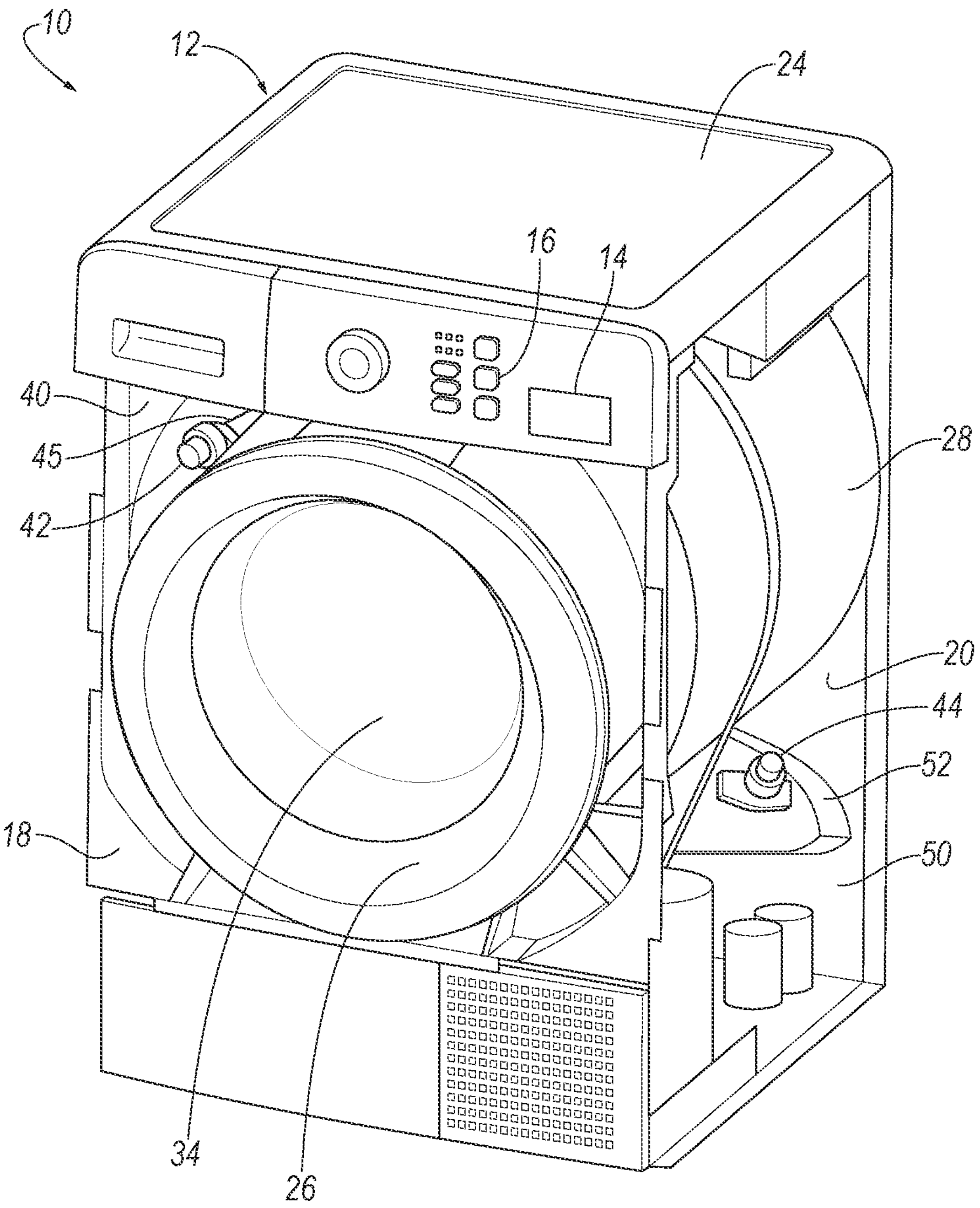
FIG. 1 is a front perspective view of a clothes dryer, wherein the clothes dryer may be controlled based on a method according to aspects of the present disclosure.

FIG. 1 illustrates one embodiment of a laundry treating appliance in the form of a clothes dryer 10 according to aspects of the present disclosure. While the laundry treating appliance is illustrated as a front-loading dryer, the laundry treating appliance according to aspects of the present disclosure may be another appliance which performs a cycle of operation on laundry, non-limiting examples of which include a top-loading dryer, a combination washing machine and dryer; a tumbling or stationary refreshing/revitalizing machine; an extractor; a non-aqueous washing apparatus; and a revitalizing machine.

As illustrated in FIG. 1, the clothes dryer 10 may include a cabinet 12 in which is provided a controller 14 that may receive input from a user through a user interface 16 for selecting a cycle of operation and controlling the operation of the clothes dryer 10 to implement the selected cycle of operation. The clothes dryer 10 may offer the user a number of pre-programmed cycles of operation to choose from, and each pre-programmed cycle of operation may have any number of adjustable cycle modifiers. Examples of such modifiers include, but are not limited to chemistry dispensing, load size, a load color, and/or a load type.

The controller 14 may have a processor for controlling certain cycles, components, etc. The controller 14 may be electrically connected to signaling interfaces of other components of the dryer 10, thereby allowing the processor of the controller 14 to manipulate the functions of the dryer 10. For example, the controller 14 may be configured to receive user input from the user interface 16, such as requests to initiate a laundry cycle. The controller 14 may also be configured to control communication to devices external to the dryer 10. The processor may include one or more microprocessors, micro-controllers, digital signal processors, microcomputers, central processing units (CPU), graphical processing units (GPU), tensor processing units (TPU), field programmable gate arrays, programmable logic devices, state machines, logic circuits, analog circuits, digital circuits, or any other devices that manipulate signals (analog or digital) based on computer-executable instructions residing in a memory 90.

The cabinet 12 may be defined by a chassis or frame supporting a front wall 18, a rear wall 20, and a pair of side walls (not labeled) supporting a top wall 24. A door 26 may be hingedly mounted to the front wall 18 and may be selectively moveable between opened and closed positions to close an opening in the front wall 18, which provides access to the interior of the cabinet 12. A door sensor (labeled as door sensor 27 in FIG. 4) may be arranged at the door 26 to detect whether the door 26 is shut.

A rotatable drum 28 may be disposed within the interior of the cabinet 12 between opposing front and rear bulkheads 30 and 32, which collectively define a treating chamber 34 having an open face that may be selectively closed by the door 26. The drum 28 may include at least one baffle or lifter (not shown). In most clothes dryers 10, there are multiple lifters. The lifters may be located along the inner surface of the drum 28 defining an interior circumference of the drum 28. The lifters may facilitate movement of laundry within the drum 28 as the drum 28 rotates.

The drum 28 may be rotated by a suitable drive mechanism, including in one example a motor and a belt. The motor may be operably coupled to the controller 14 to control the rotation of the drum 28 to complete a cycle of operation. Other drive mechanisms, such as direct drive, may also be used.

The front wall 18 may form a bulkhead area 40 between the front wall 18 and the drum 28. The bulkhead area 40 may house an air channel 45 or first air conduit 45 in fluid communication with the drum 28. The air channel 45 may extend from the drum 28 to the front wall 18. At least one first vent cover 42 may be arranged on the air channel 45 and be configured to selectively open the air channel 45 to the bulkhead area 40 such that air may pass therethrough. When open, the first vent cover 42 may allow air external to the dryer 10 to enter the drum 28 via an opening 54 (illustrated in FIG. 2) at the air channel 45. This may include oxygen that may circulate through the dryer 10 while the dryer door 26 is closed and the dryer is not operating.

The back wall 20 may form a basement area 50 between the back wall 20 and the drum 28. The basement area 50 may house, or partially house, a dryer vent 52 or second air conduit 52. A second vent cover 44 may be arranged on the dryer vent 52. The second vent cover 44 may allow for carbon monoxide or other gasses to leave the dryer 10 via the dryer vent 52 when the opening 54 defined by the dryer vent 52 is in an open position. The opening 54 on the air channel 45 and the dryer vent 52 may be selectively closed via respective vent covers 42, 44.

Although not shown, an air flow system, including the air channel 45, may supply air to the treating chamber of the drum 28 and exhaust the air via the dryer vent 52. A fan and a heater (each not specifically shown) may lie within the air channel 45 and may be operably coupled to and controlled by the controller 14. If the heater is cycled on, the supplied air will be heated prior to entering the drum 28. The air supply system may further include an air exhaust portion that may be formed in part by a dryer vent 52. Operation of the fan draws air into the treating chamber by the air channel 45 and exhausts air from the treating chamber through the dryer vent 52. The dryer vent 52 may be fluidly coupled with a household exhaust duct (not shown) for exhausting the air from the treating chamber 34 to the outside environment. However, other air flow systems are possible as well as other arrangements of the fan and heater. For example, the fan may be located in the dryer vent 52 instead of the air channel 45.

Figure 2:
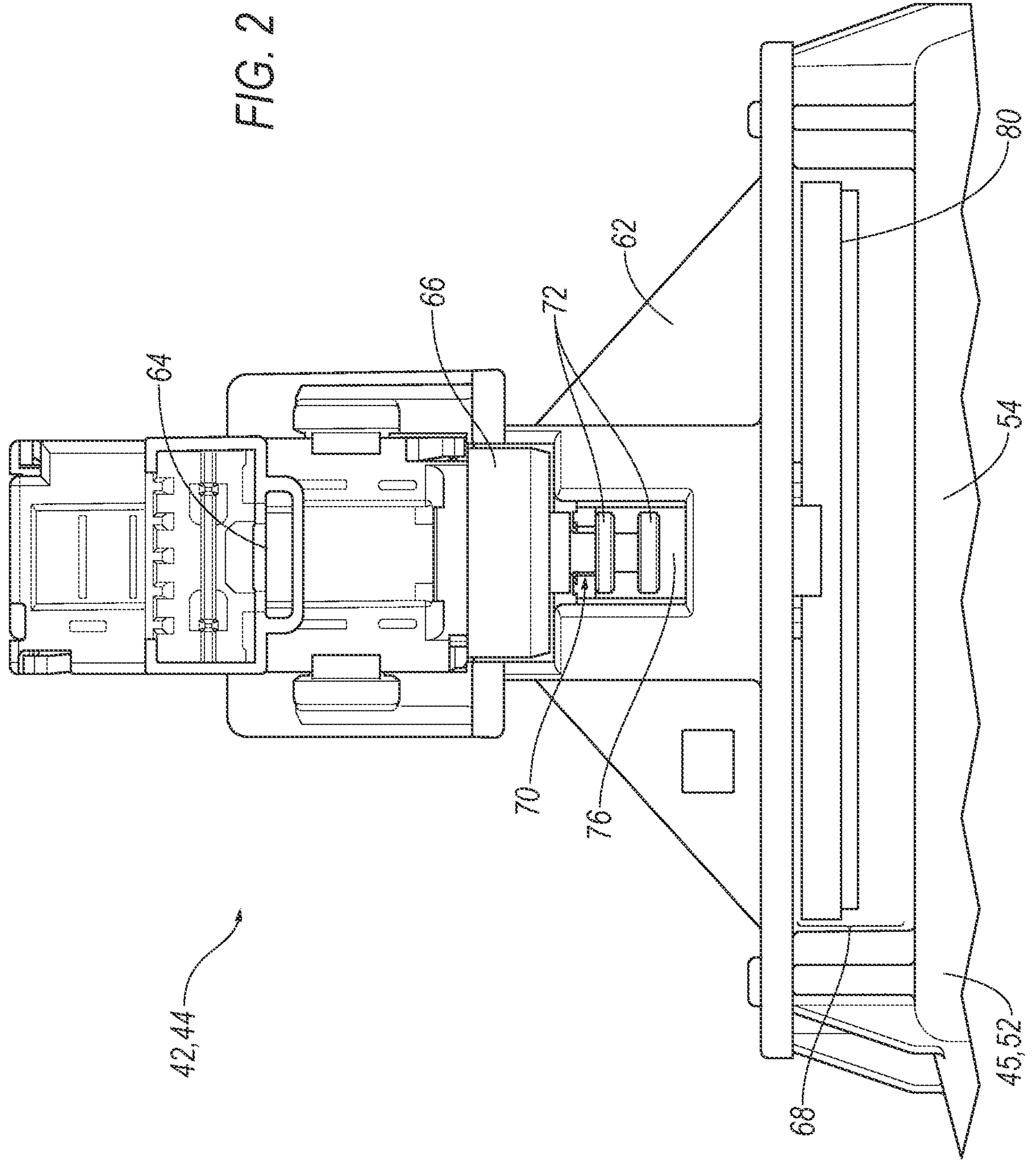
FIG. 2 is a front view of a vent cover of FIG. 1 in an open position.
Figure 3:
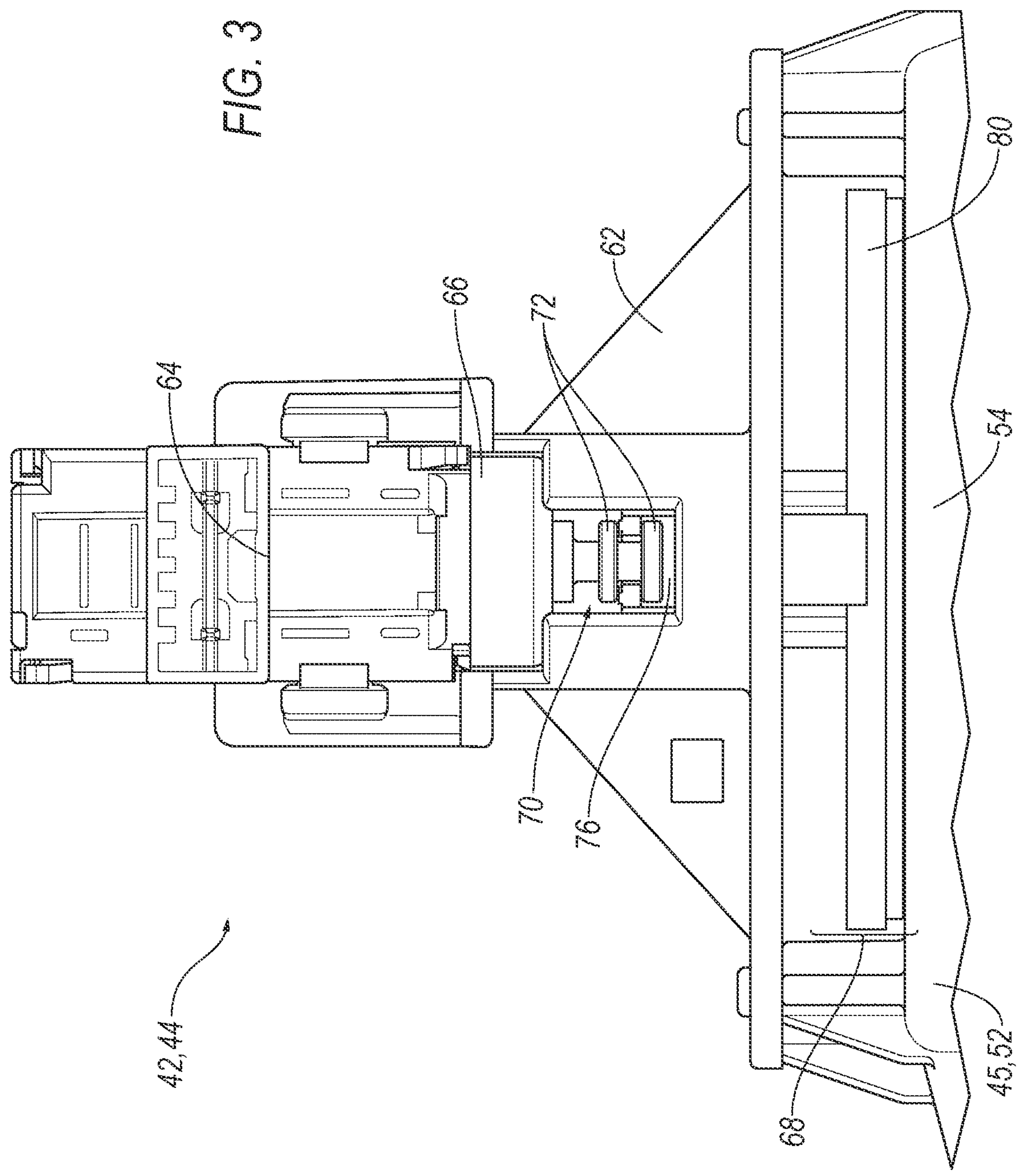
FIG. 3 is a front view of the vent cover of FIG. 1 in a closed position.

Referring to FIGS. 2 and 3, the vent cover 42, 44 for the respective air channel 45 and dryer vent 52 is illustrated. In FIG. 2, the example vent cover 42, 44 is illustrated in an open position while in FIG. 3, the example cover 42, 44 is illustrated in a closed position. The air channel 45 and dryer vent 52 may each define an opening 54. The cover 42, 44 may include a frame 62 configured attach to the air channel 45 and dryer vent 52. The frame 62 may form a support to receive a portion of a motor 64 and at least a portion of a plunger 74, or plunger seal. The frame 62 may provide for an open area 68 between the frame 62 and the opening 54. The motor 64 may drive the plunger 74 between open and closed positions within the open area.

The motor 64, as explained, may be a wax motor, but other motors may be further contemplated. The frame 62 may define a receptacle 66 being open at the proximal and distal ends of the frame 62. However, other configurations for the receptacle 66 may be contemplated where the receptacle 66 is not open to one or both ends. The receptacle 66 is configured to receive at least a portion of the motor 64. The receptacle 66 may define a hollow area within the frame 62 in a cylindrical or quadratic shape configured to mimic that of the shape of the motor 64. The motor 64 may be fixed within the receptacle 66, but in an alternate configuration, the motor 64 may be configured to move linearly within the receptacle 66. In one example, the motor may snap and connect within the receptacle 66.

A piston 70 may extend from a distal end of the motor 64 at the distal end of the receptacle 66 closest to the opening 54. The piston 70 may be configured to actuate between a retracted position and an extended position. The piston 70 may include at least one lip 72 at its distal end to engage a neck 76 of the plunger 74. In the example shown in FIGS. 2 and 3, the lip 72 includes a pair of lips 72.

The plunger 74 may include a neck 76 extending from a base 80. The neck 76 may be substantially centered on the base 80. The neck 76 may be retained in a fixed position on the piston 70 via engagement with the at least one lip 72. In this event, the neck 76 of the plunger 74 will actuate in response to actuation by the piston 70.

The base 80 may be arranged directly over the opening 54. The base 80 may have an area configured to cover the entire opening 54 so as to prevent airflow in or out of the opening 54. In a closed position, as illustrated by way of example in FIG. 3, the piston 70 of the motor 64 may actuate the plunger 74 such that the plunger 74 is forced by the piston 70 towards the opening to create a seal between the air channel 45 and/or dryer vent 52 and the base 80, sealing the opening 54 and preventing any passive ventilation via the opening 54 By driving the neck 76 of the plunger 74 downward, a seal is created around the opening 54 via the pressure increase caused by the force of the neck 76. The plunger 74 may be formed of a rubber or rubber-like material, being bendable when confronted with a force, but rigid enough to return to its original shape.

In an open position, as illustrated by way of example in FIG. 2, the motor 64 may retract the piston 70, pulling or receding the neck 76 and subsequently the base 80 of the plunger 74 away from the opening 54. This may allow the seal around the opening 54 to be broken and the base 80 to move within the open area 68. Once the opening 54 is uncovered, ambient air is able to flow there through in the example of the first opening on the air channel 45 and carbon monoxide is able to be exhausted via the second opening 54 on the dryer vent 52.

Thus, by driving the plunger 74 via the motor 64, a simple but effective selectable seal may be created. The motor 64 may be controlled by a special purpose controller or the controller 14 as discussed with respect to FIG. 1.

Figure 4:
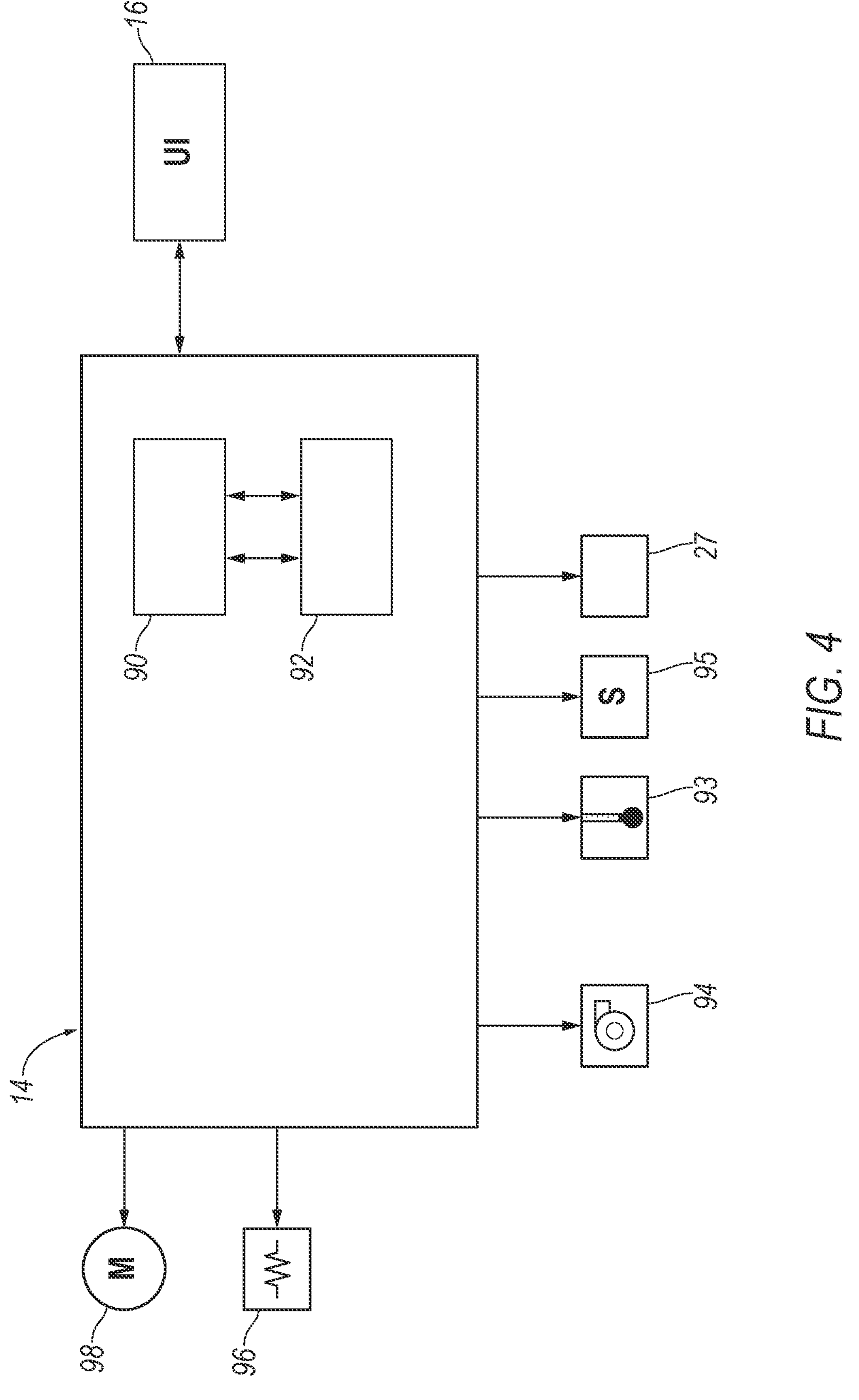
FIG. 4 is a block diagram of a control system for the appliance of FIG. 1.

As illustrated in FIG. 4, the controller 14 may be provided with a memory 90 and a CPU 92. The memory 90 may be used for storing the control software that may be executed by the CPU 92 in completing a cycle of operation using the clothes dryer 10 and any additional software. The memory 90 may also be used to store information, such as a database or table, and to store data received from the one or more components of the clothes dryer 10 that may be communicably coupled with the controller 14.

The memory 90 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage may include one or more persistent data storage devices such as a hard drive, optical drive, tape drive, non-volatile solid-state device, cloud storage or any other device capable of persistently storing information. The memory 90 may maintain data to be displayed on the user interface 16. This data may be updated, as is described herein.

The dryer 10 may have a wireless transceiver (not shown) configured to transmit and receive digital signals. The dryer 10 may communicate with a cloud system (not shown) configured to maintain information and communication with the dryer 10 as well as with other devices such as a user's mobile device. The cloud system includes a cloud server or computing device configured to maintain information and communicate with the dryer 10.

The controller 14 may be operably coupled with one or more components of the clothes dryer 10 for communicating with and/or controlling the operation of the component to complete a cycle of operation. For example, the controller 14 may be coupled with a fan 94 and a heater 96 for controlling the temperature and flow rate of the air flow through the treating chamber 34; the motor (labeled motor 98 in FIG. 4) for controlling the direction and speed of rotation of the drum 28; a temperature sensor 93 for receiving information about the temperature of the exhaust air flow; and the user interface 16 for receiving user selected inputs and communicating information to the user. The controller 14 may also receive input from various additional sensors 95, which are not shown for simplicity. Non-limiting examples of additional sensors 95 that may be communicably coupled with the controller 14 include: a treating chamber 34, a temperature sensor 93 a supply air flow temperature sensor 93, a moisture sensor, an air flow rate sensor, a weight sensor, and a motor torque sensor. Specifically shown is the door sensor 27 which may report the door status to the controller 14.

Generally, in normal operation of the clothes dryer 10, a user first selects a cycle of operation via the user interface 16. The user may also select one or more cycle modifiers. In accordance with the user-selected cycle and cycle modifiers, the controller 14 may control the operation of the rotatable drum 28, the fan 94 and the heater 96, to implement the cycle of operation to dry the laundry. When instructed by the controller 14, the motor 98 rotates the drum 28 via the belt. The fan 94 draws air through the air channel 45 and into the treating chamber 34. The air may be heated by the heater (labeled at heater 96 in FIG. 4). Air may be vented through the dryer vent 52 to remove moisture from the treating chamber 34.

Once the cycle is complete, the controller 14 may determine whether passive ventilation would be beneficial. This may be anytime the cycle is complete and/or the door 26 is closed. In response to determining that the cycle is complete, the controller 14 may determine that the appliance is in a passive ventilation state. As explained, the passive ventilation state may occur when the appliance is not performing a cycle. The passive ventilation state may occur when the appliance is not performing a cycle and the door 26 is closed as indicated by the door sensor 27 in communication with the controller 14.

If the controller 14 recognizes a passive ventilation state, the controller 14 may instruct the covers 42, 44 to open the respective openings 54. In response to determining that a cycle is initiating, the controller 14 may instruct covers 42, 44 to close the openings 54. That is, when the dryer 10 is running, the vent covers 42, 44 are closed to enable normal operation of the dryer 10. When the dryer 10 is not running, the vent covers 42, 44 are open to allow for passive ventilation. The controller 14 may communicate with the motor 64 of the covers 42, 44 in order to actuate the piston 70 to close the base 80 over the opening 54, 54. This may be done via wired communication or wireless communication.

Further, in another example, the controller 14 may instruct the covers 60 according to a door status (e.g., open or closed). If the door is closed and the dryer 10 is not running, the controller may instruct the covers 42, 44 to close.

While the examples described herein generally relate to airflow for the air conduits, the same principals and concepts may be applied to other dryer airflows, including the supply air conduit, among others. Further, the term "vent" is used herein to include conduits capable of carrying airflow and may be interchangeable with the exhaust air conduit, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a RAM, a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A laundry appliance, comprising:

a cabinet having a front and back connected by sides and a top and a bottom for housing a drum configured to receive laundry items and treat the laundry items during a treatment cycle, the front of the cabinet including a front bulkhead housing a first air conduit, the first air conduit defining a first opening configured to selectively receive ambient air, the back of the cabinet defining a basement area housing a second air conduit, the second air conduit defining a second opening for exhausting carbon monoxide outside of the appliance;

a door configured to move between open and closed positions to selectively allow access the drum;

a first cover arranged at the first opening;

a second cover arranged at the second opening; and a processor programmed to instruct the first cover and second cover to open in response to the appliance being in a passive ventilation state.

2. The appliance of claim 1, wherein the passive ventilation state is when the appliance is not performing a treatment cycle.

3. The appliance of claim 1, wherein the passive ventilation state is when the appliance is not performing a treatment cycle and the door is closed.

4. The appliance of claim 1, wherein each of the first cover and second cover include a plunger seal driven by a wax motor.

5. The appliance of claim 4, wherein each of the first cover and second cover include a frame configured to maintain the plunger seal and the wax motor over a respective one of the first opening and the second opening.

6. The appliance of claim 5, wherein the plunger seal includes a neck configured to engage with a piston of the motor to allow the plunger seal to be driven by the motor.

7. The appliance of claim 5, wherein the motor is configured to actuate the plunger seal in response to instructions from the processor to move the first cover and second cover from the open position to the closed position and from the closed position to the open position.

8. The appliance of claim 7, wherein the motor is configured to drive the plunger seal towards the respective opening to seal the opening in the closed position.

9. The appliance of claim 7, wherein the motor is configured to pull the plunger seal away from the respective opening to release the seal at the opening for the open position and during the passive ventilation state.

10. A vent cover for an air conduit of a laundry appliance, comprising:

a frame defining a receptacle open at a proximal and distal end of the frame, the frame configured to attach to an air conduit;

a motor arranged within the frame, the motor having a piston extending from a distal end of the motor and configured to selectively actuate;

a plunger seal having a neck extending from a base, the neck attached to the piston and configured to move laterally upon actuation of the piston between and open position and a closed position, where the base is configured to abut and seal an opening defined in the air conduit in the closed position to prevent air from escaping the opening and to recede from the opening in the open position to allow air to flow from the opening.

11. The vent cover of claim 10, where the piston includes at least one lip configured to engage the neck of the plunger seal.

12. The vent cover of claim 10, where the motor is a wax motor.

13. The vent cover of claim 10, where the plunger seal is formed of a rubber material.

14. The vent cover of claim 10, where the motor is configured to actuate the piston in response to instructions from a processor to move the cover to the open position in response to the appliance being in a passive ventilation state.

15. The vent cover of claim 14, wherein the passive ventilation state occurs when the appliance is not performing a treatment cycle.

16. The vent cover of claim 14, wherein the passive ventilation state occurs when the appliance is not performing a treatment cycle and a door of the appliance is closed.

17. The vent cover of claim 14, wherein the air conduit is open to a drum of the appliance.

18. A laundry appliance, comprising:

a cabinet having a front and back connected by sides and a top and a bottom for housing a drum configured to receive laundry items and treat the laundry items during a treatment cycle;

a door configured to move between open and closed positions to selectively allow access to the drum;

at least one air conduit configured to supply air to a drum of the appliance;

at least one vent cover configured to selectively vent air from the air conduit; and a processor configured to:

instruct a motor of the at least one vent cover to actuate to open the vent cover in response to the door being closed and the appliance not performing a treatment cycle.

19. The appliance of claim 18, wherein actuation of the vent cover recedes a plunger seal of the at least one vent cover to allow air to vent through the air conduit.

* * * * *